United States Patent [19]

Beynet et al.

[11] 4,040,003
[45] Aug. 2, 1977

[54] DOWNHOLE SEISMIC SOURCE

[75] Inventors: Pierre A. Beynet; John B. Farr; Newell Pottorf, all of Tulsa, Okla.

[73] Assignee: Standard Oil Company (Indiana), Chicago, Ill.

[21] Appl. No.: 652,262

[22] Filed: Jan. 26, 1976

Related U.S. Application Data

[62] Division of Ser. No. 511,141, Oct. 2, 1974, abandoned.

[51] Int. Cl.² .............................................. G01V 1/40
[52] U.S. Cl. ............................ 340/18 LD; 340/18 NC; 181/106; 175/40
[58] Field of Search .................... 181/102, 106, 119; 340/18 LD, 18 NC, 405; 166/113, 250; 175/39, 40, 44, 46, 48, 297; 116/137 R

[56]         References Cited
         U.S. PATENT DOCUMENTS

| 2,422,031 | 6/1947 | Merten | 175/39 |
| 2,560,328 | 7/1951 | Biblstein | 175/39 |
| 2,652,232 | 9/1953 | Holland | 175/46 |
| 3,813,656 | 5/1974 | Fowler | 340/18 NC |
| 3,853,184 | 12/1974 | McCullough | 175/39 |
| 3,876,016 | 4/1975 | Stinson | 175/46 |

Primary Examiner—Nelson Moskowitz
Attorney, Agent, or Firm—John D. Gassett

[57]  ABSTRACT

A downhole seismic source for use when drilling a borehole in the earth using a rotating drill string through which a drilling fluid is circulated. In one embodiment, a section of the drill string has a slot in it and a sleeve rotatably surrounding the slot with a plurality of spaced-apart slots arranged to align with the slot in section of drill pipe during rotation of the sleeve with respect to the section. In operation this generates a controlled seismic signal. In another embodiment the bit is modified to have a fluid passage with a valve therein that opens and closes in a selected pattern during rotation of the drill bit.

5 Claims, 10 Drawing Figures

AXIS OF ROTATION

DOWNHOLE SEISMIC SOURCE

This is a division of application Ser. No. 511,141, filed Oct. 2, 1974 now abandoned.

BACKGROUND OF THE INVENTION

1. Field of the Invention

This invention relates to the determination of the location of the bottom of a hole drilled in the earth or some other downhole point in the wellbore. It relates especially to generation of a seismic signal at the drill bit (or other selected point along the drill string) and detecting the transmitted signals at the surface of the earth so that the horizontal and vertical position of the downhole point can be determined. It also relates especially to a novel apparatus for initiating the downhole seismic signal.

2. Prior Art

Various methods have been used to determine the location of the bottom of a borehole. For example, commercially available inclination and direction surveys can be run and an accurate determination made of the course of the borehole. One particular class of wells where it is especially important to follow closely the path of the bit during drilling is those that are purposely deviated to penetrate the producing stratum at a specific distance and direction of offset from the wellhead. It is to be remembered that when a borehole is drilled in the earth, it is almost never perfectly vertical. Its path frequently resembles an elongated corkscrew, and sometimes the deflection is much more in one direction than in another. This is the reason why is is both difficult and important to know the location of the bottom of the borehole as it is being drilled. In the prior art method of using the well survey, drilling must be stopped. Perhaps the closest prior art is U.S. Pat. No. Re 18,565, E. E. Rosaire, issued Aug. 9, 1932, for "Method of Determining the Straightness of Drill Holes in the Earth." In the Rosaire patent, the exact time of detonation of an explosive charge must be known; however, that is not a requirement in the present application.

Another patent of interest is U.S. Pat. No. 2,933,144, J. G. Scott, et al., issued Apr. 19, 1960. However, that patentee does not use his seismic signals which were generated at the drill bit in order to determine the horizontal location of it, such as is done in the present application.

SUMMARY OF THE INVENTION

This invention concerns a downhole seismic source for use in drilling a borehole in the earth using a rotating drill string through which a drilling fluid is circulated. In a preferred embodiment a section of drill string is provided with one slot in the wall thereof and a sleeve is rotatably mounted about this section. This sleeve has a plurality of spaced-apart slots arranged to align with the slot in the section during rotation of the sleeve so as to produce a predetermined seismic signal. In another embodiment, the drill bit is provided with a fluid nozzle to receive drilling fluid from the drill string and a valve means is provided to alternately open and close this fluid nozzle as the drill string rotates so as to generate a downhole seismic signal.

BRIEF DESCRIPTION OF THE DRAWINGS

Various objects and a better understanding of the invention can be had from the following description taken in conjunction with the drawings, in which.

DETAILED DESCRIPTION OF THE INVENTION

Figure 1:
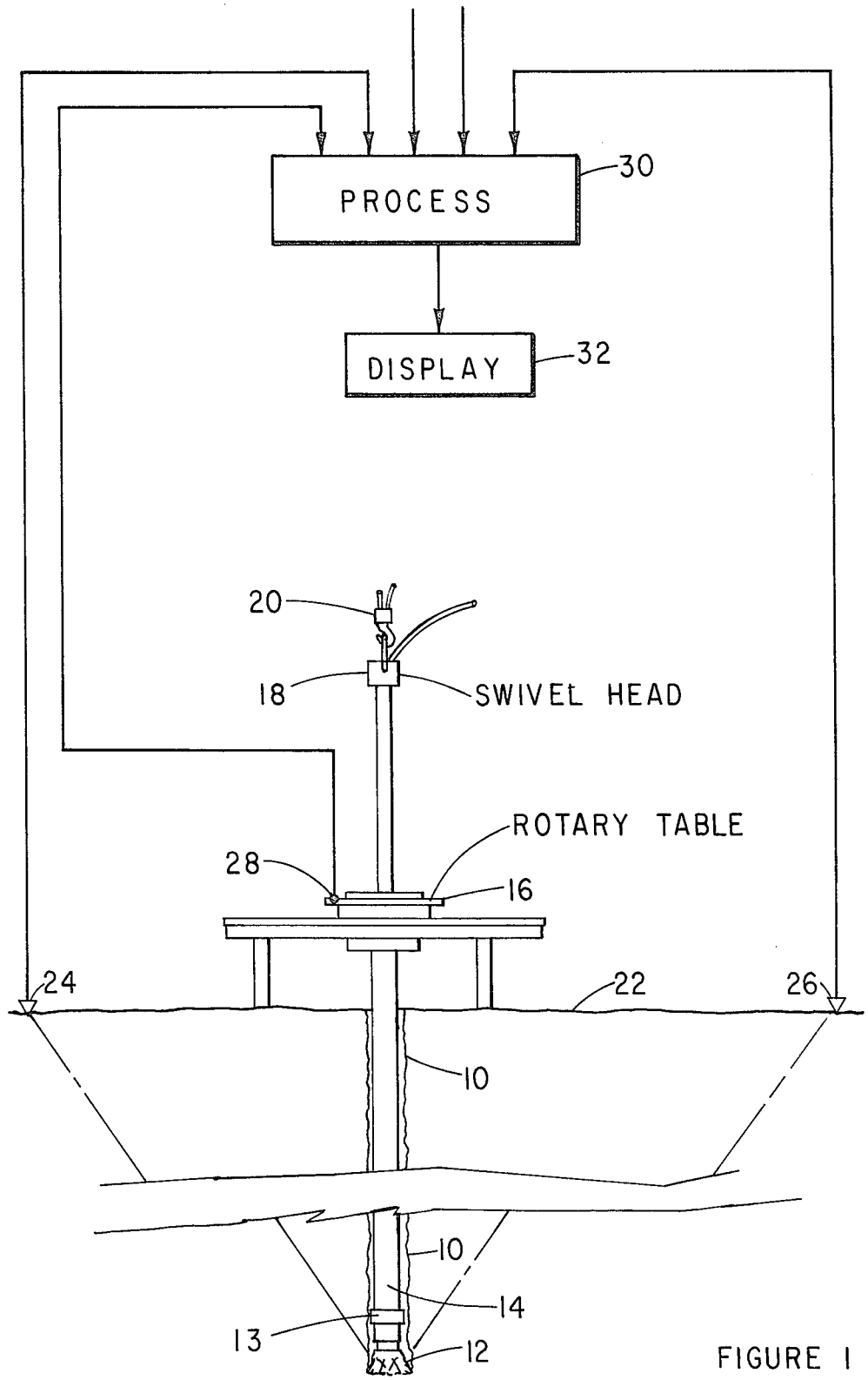
FIG. 1 is a side elevation view partly in section schematically illustrating a well being drilled and illustrating the overall system of carrying out our invention.

Attention is first directed to FIG. 1, which shows a borehole 10 being drilled in the earth by a bit 12 at the lower end of a drill string 14. The position of bit 12 is shown directly below the surface location of the borehole. However, this is seldom, if ever, the case. It is the exact position of the bottom of the borehole or the bit, which is needed by the drilling engineer. The drill string 14 is turned by a rotary table 16 supported on the surface of the earth 22. A swivel joint 18 supports the drill string 14 from a means 20 supported by a derrick, not shown. By the use of mud sirens or modifications of bit 12, as will be discussed later, a seismic signal or radiated signal is imparted into the earth at the bit and travels along various paths to the surface where it is detected by seismometers 24 and 26 at locations spaced from each other and from the wellbore. The input signal is a function of the rotation of drill string 14 and a simulated or counterpart input signal is picked up at point 28 from the rotary table. Details of this will be discussed later. The resulting waves detected at locations 24 and 26 and at least one other location, and preferably at least two (making a total of four or more locations), are transmitted to a processing means 30, where the signals are analyzed and the horizontal components of the position of bit 12 are determined and shown on display 32. Various manners of processing these detected signals and displaying them will be described also in greater detail hereinafter. It is preferred to use a "muffler" or isolator 13 about drill string 14 just above the bit to limit the strength of the part of the generated signal which would otherwise travel up the column of fluid in the borehole. A suitable muffler is a Helmholtz resonator.

Figure 2:
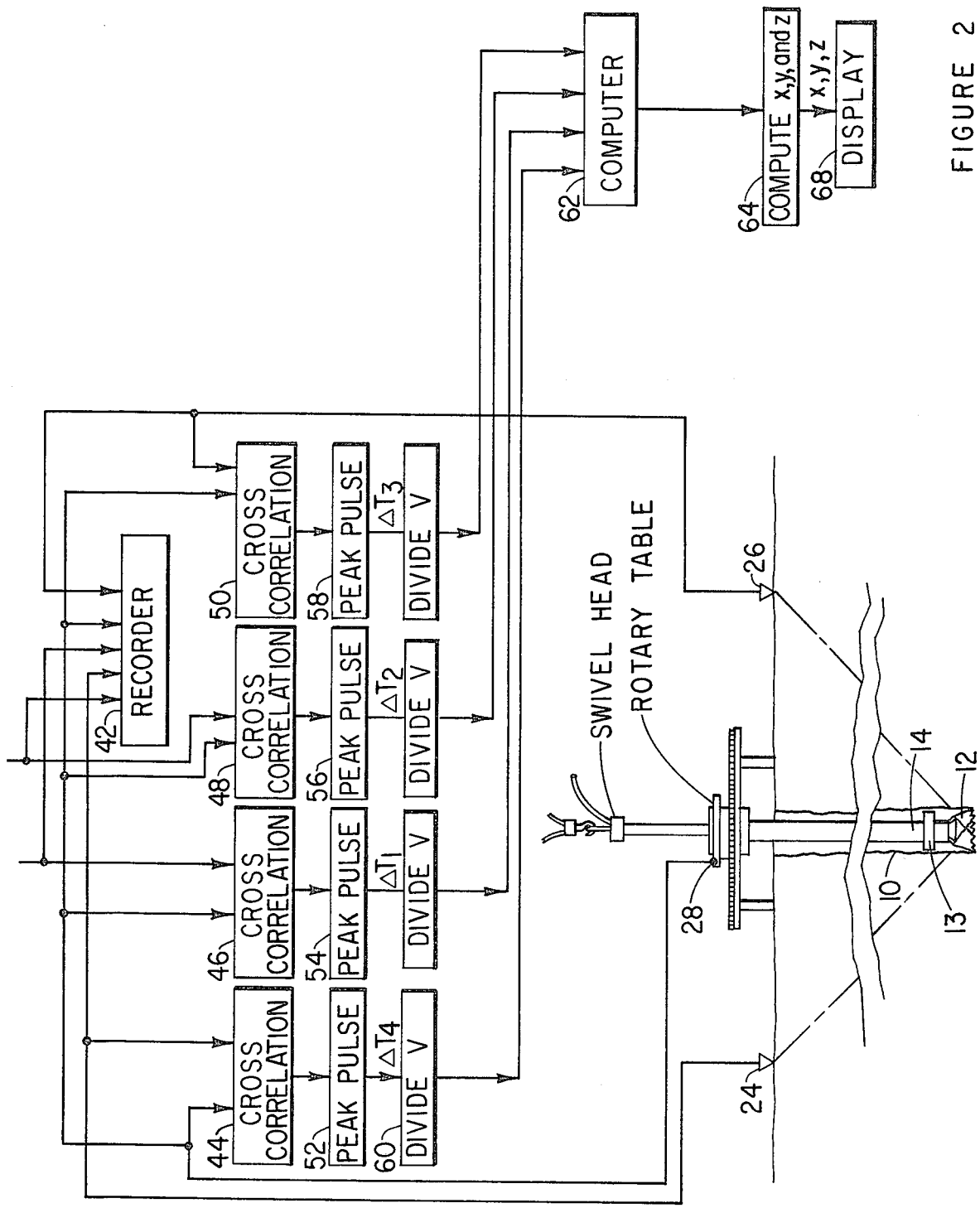
FIG. 2 is also a side elevation view of a well being drilled in the earth and includes in diagram form means for determining the horizontal location of the bottom of the hole in those instances in which the radiated signal is known.
Figure 3:
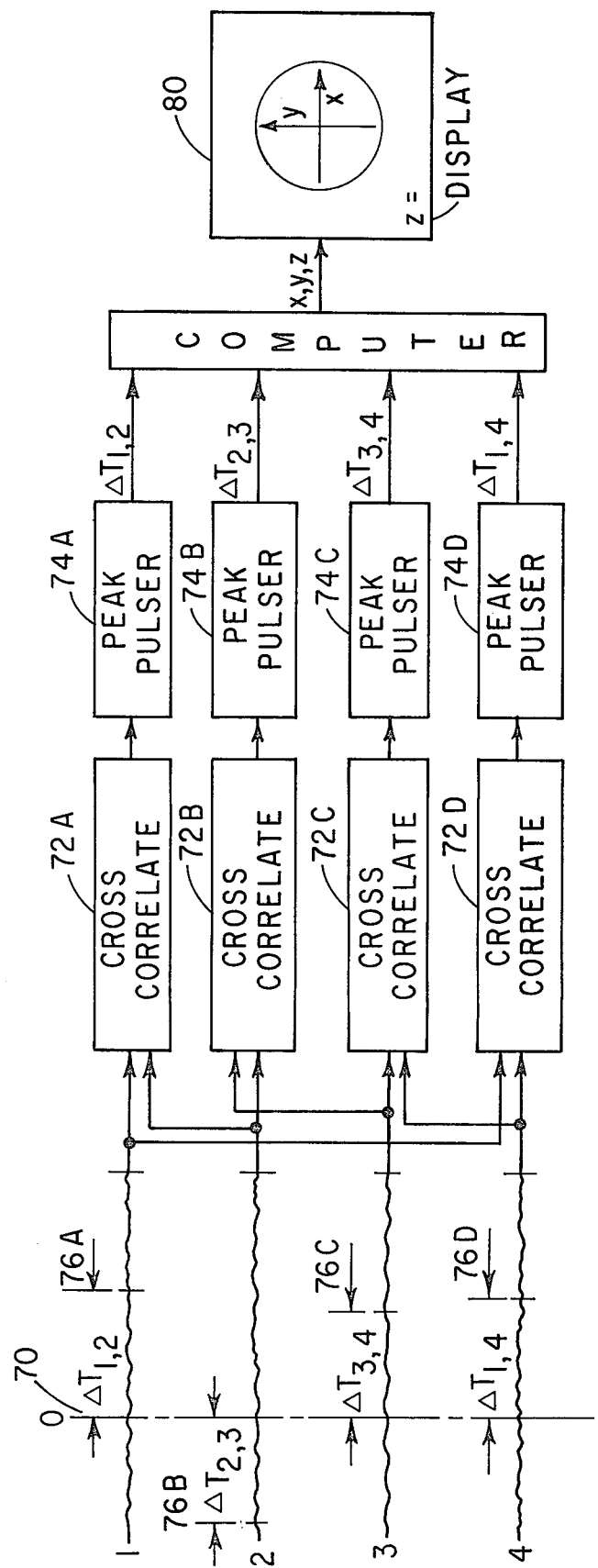
FIG. 3 illustrates schematically the processing of the four seismic signals detected at the four seismic locations, if the radiated or input signal is unknown, in order to obtain the horizontal location of the drill bit.
Figures 4, 5, 6:
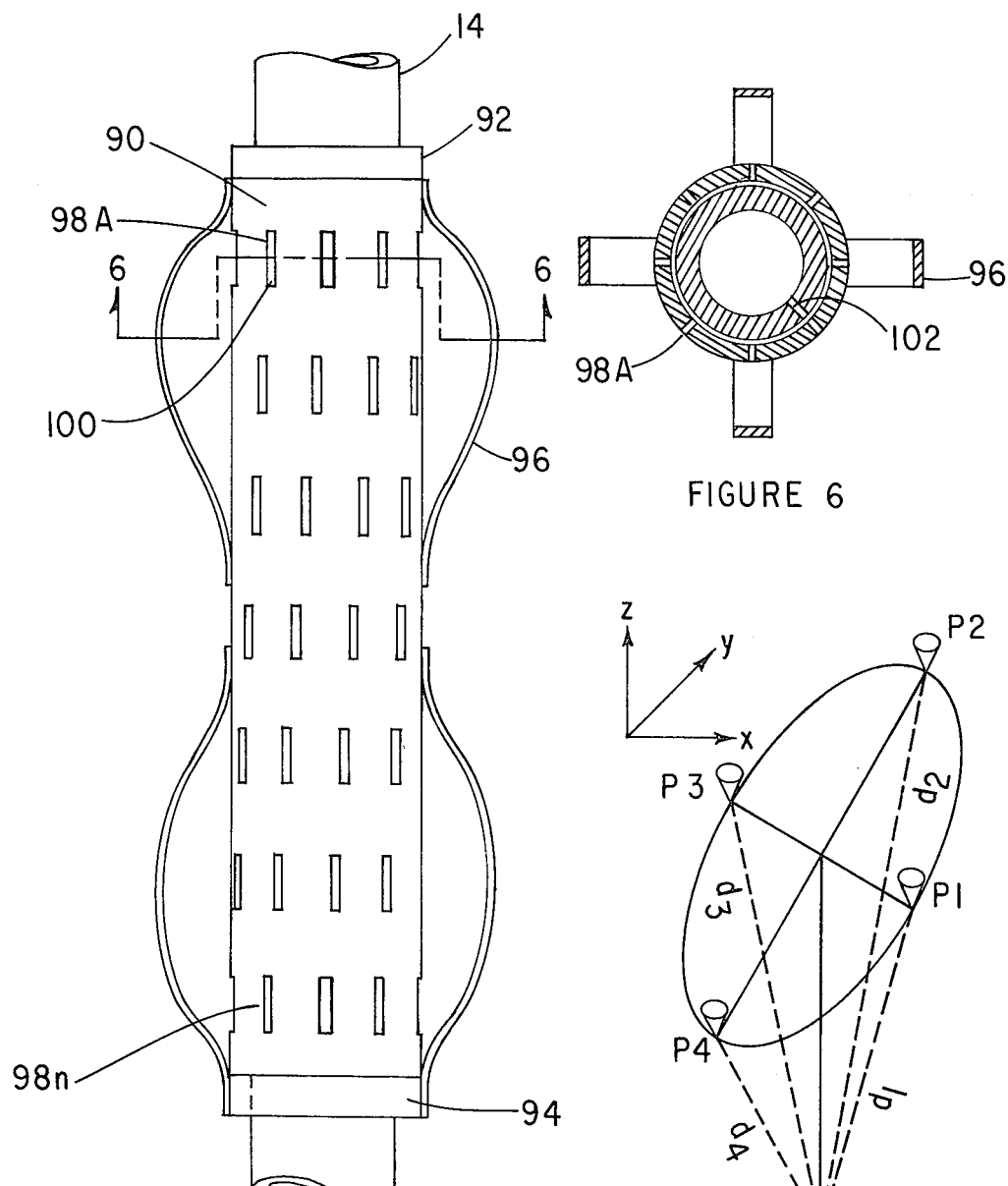
FIG. 4 is a geometrical illustration useful in explaining the method of our invention.
FIG. 5 is a preferred and novel form of a downhole mud siren.
FIG. 6 is a section taken along the line 6—6 of FIG. 6.

We will consider two main situations in determining the downhole location. The first is when we know the radiated signal or the input signal downhole, that is, its form and the time at which it was imparted into the earth. The second situation we will consider is when we do not know the form or shape or the time of the input signal. We teach methods which can handle either situation. We will first consider that situation where we know what the input signal is, and, for a further discussion of this, we first make reference primarily to FIG. 2. Elements of FIG. 2 which are similar to FIG. 1 are given the same reference numerals. The geophones $P_1$, $P_2$, $P_3$, $P_4$, in FIG. 4, have, as indicated in FIG. 3, output signals 1, 2, 3, and 4, respectively. In this case the input or simulated radiated signal is detected at point 28 of the rotary table and it is conveyed to recorder 42 and to an input to cross correlators 44, 46, 48, and 50. Suitable means for generating this simulated signal will be described later. The signals from the four geophones are connected to a recorder 42. In addition, the input or radiated signal from the rotary table is connected to each of four cross correlators 44, 46, 48, and 50. The other input to each of these cross correlators is connected to the output from a respective or corresponding one of seismometer locations $P_1$, $P_2$, $P_3$, and $P_4$, as indicated in FIG. 4. We thus cross-correlate the radiated signal with the received signals to get correlation curve maxima which in turn give travel times along the paths 1 to 4, or designations $d_1$, $d_2$, $d_3$, and $d_4$ of FIG. 4, which is the distance from the origin 0 of the input signal to each of the four seismometer locations. The arrival (or travel) times of the received signals are designated $t_1$, $t_2$, $t_3$, and $t_4$. The time $t$ is shown as a distinct pulse in the signal resulting from the correlation of the two signals and can be selected by a peak pulse detector 52, 54, 56, and 58, which are connected to the output of cross correlators 44, 46, 48 and 50, shown in FIG. 2. We can also show that $$t_1 = d_1/V,$$
$$t_2 = d_2/V,$$
$$t_3 = d_3/V,$$
$$t_4 = d_4/V$$

Where the various terms in these equations are illustrated in FIG. 4 and $d_1$, $d_2$, and $d_3$ and $d_4$ are the distances from the origin 12 to the respective seismometer locations $V$ is the average velocity of the waves through the earth at this location If we know the true origin time of the signal at point 0 and the velocity of the seismic wave, we can easily determine $d_1$, $d_2$, $d_3$, and $d_4$.

If one knows the exact origin time of the signals, one can quickly figure the position of the source relative to the receivers from these equations.

Frequently, the true origin time of the signals is not known. Under this assumption, the source position can still be found despite the fact that the travel times $t_1$, $t_2$, $t_3$, and $t_4$ are not known.

The true arrival time at any receiver, $n$, is $$T_i = t_i + T_o$$

where $t_i$ is the travel time and $T_o$ is the true time the signal left the source. Since, as shown above, the travel time $t_i = d_i/V$, this equation can be rewritten as $$T_i = (d_i/V) + T_o$$

Now, if the difference in true arrival times can be determined, for example, by cross correlation, these differences above can provide sufficient information to locate the source. Let $$d_1 - d_2 = V(T_1 - T_2) = V\Delta T_{1,2}$$
$$d_2 - d_3 = V(T_2 - T_3) = V\Delta T_{2,3}$$
$$d_3 - d_4 = V(T_3 - T_4) = V\Delta T_{3,4}$$

Each of these three hyperboloids of revolution (the axes of revolution are the lines $P_1 P_2$, $P_2 P_3$, $P_3 P_4$) contains the bit 12. In general, these three hyperboloids interesect at two points, one on each side of the plane $P_1 P_2 P_3$, so that one can determine the coordinates $x$, $y$, $z$ of the bit 12.

In many cases, V, the velocity, is known, as a function of the depth Z. This is obtained from logs and other wells in the area or from seismic data. The terms $T_1 - T_2$, $T_2 - T_3$, $T_3 - T_4$ are measured and represent differences in arrival times of the signal at the four surface locations shown. These are equal to differences in maximum correlation valve times indicated by the maximum peaks which we discussed above.

If the velocity is not known, one can use a conventional directional survey to establish $d_1$, $d_2$, $d_3$, and $d_4$ and take the record to get $\Delta T_{1,2}$, $\Delta T_{2,3}$, $\Delta T_{3,4}$, and from this can obtain V. This value can then be used in the further drilling of the borehole with reasonable assurance of accurate results. Five receivers or more can be used to determine the position of the bit 12. For example, take five receivers and assume that $$T_0 < T_1 < T_2 < T_3 < T_4 < T_5$$

$T_0$ being the time at which the signal is generated at the bit. From $$d_i = (T_i - T_0) V (i = 1, 2, 3, 4, 5)$$

We obtain
$$d_5 - d_1 = (T_5 - T_i) V (i = 1, 2, 3, 4)$$

and $$\frac{d_5 - d_i}{d_5 - d_4} = \frac{T_5 - T_i}{T_5 - T_{41a,2}} \quad (ti\ i = 1, 2, 3)$$

Let $$A_i = (T_5 - T_i)/(T_5 - T_4)\ (i = 1, 2, 3)$$

Then 12 lies on the three surfaces:

$$(A_i - 1) d_5 + A_i d_4 + d_i = 0 (i = 1, 2, 3)$$

which in general have two points of intersection. The bit 12 coincides with the point below the plane $P_1$, $P_2$, $P_3$.

From these equations, the coordinates of the bit are calculated.

Now that $x$, $y$, and $z$ are determined, they can be displayed in any manner. A conventional manner of displaying them is on the face of a cathode ray tube, for example. A computer for computing $x$, $y$ and $z$ is indicated as reference numeral 64 in FIG. 2, and the display for illustrating $x$, $y$ and $z$ is produced at 68. As these computers and displays are well known, no further comment need be made on them.

Frequently, the radiated signal is unknown. If such is the case, we can use the system generally illustrated in FIG. 3. Shown thereon at the left of the figure are four signals, 1, 2, 3 and 4, which are singals which have been simultaneously detected at seismometer locations 34, 36, 38 and 40. We draw an arbitrary zero time line 70. As indicated in FIG. 3, we cross-correlate a segment of each signal 1, 2, 3 and 4 with at least two other signals in cross correlator 72A to 72D. Ordinarily we cross-correlate a signal with the signals from the two closest seismometer locations. An arbitrary segment of any one of signals 1, 2, 3, or 4 is chosen as the reference and correlated with each of the others to give a relative delay time, plus or minus, in units of the time base of signals 1–4. We pick the peak of the output of the correlation with peak pulse pickers 74A, 74D. We then have determined $\Delta T_{1,2}$, $\Delta T_{2,3}$, $\Delta T_{3,4}$ and $\Delta T_{1,4}$, which are indicated in curves 1, 2 and 3 at points 76A, 76B, 76C and 76D. The times of the correlation peaks give $\Delta T_{1,2}$, $\Delta T_{2,3}$, $\Delta T_{3,4}$, and $\Delta T_{1,4}$ directly. Once we have determined the $\Delta T$'s in the device of FIG. 3, we compute $x$, $y$ and $z$, as described above, using $\Delta T_{1,2} \Delta T_{2,3} \Delta T_{3,4}$ (and $\Delta T_{1,4}$ as a check). This is done in a general purpose computer which is illustrated as block diagram 78. The output from computer 78 is shown on display 80.

Figure 10:
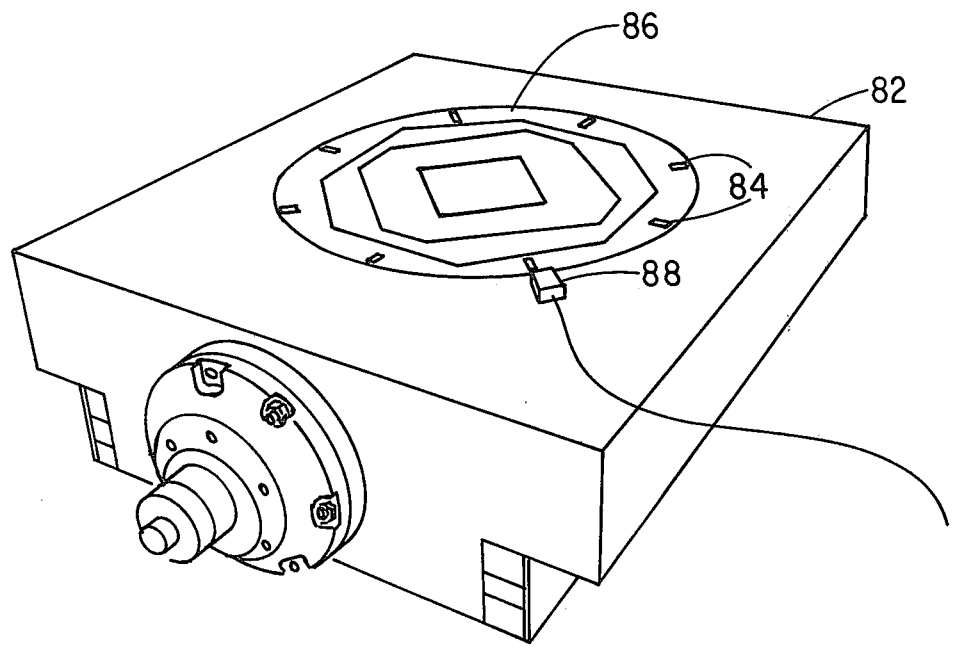
FIG. 10 shows a modification of the rotary table to obtain a simulated input signal.

Attention is now directed to FIG. 10 to show one way of obtaining a simulated input or "surface replica" of "counterpart" of the downhole radiated signal. Shown in FIG. 10 is a rotary table 82 which has been sightly modified. A plurality of magnets 84 has been placed about the periphery of rotating plate or disc 86. Positioned on a non-rotating part of the cable 82 but adjacent disc 86 is a reed switch 88, which emits a pulse each time a magnet 84 is rotated past it. The number of magnets 84 will be coordinated in some manner with the interruptions of the circulating fluid downhole for each revolution of the drill string. The output from switch 88 is repesentative of the input or radiated signal.

Attention is now directed to FIGS. 5 and 6, which show a preferred form of downhole mud siren or fluid flow modulator. Mounted on drill string 14 is slotted sleeve 90, which is held in a vertical position on drill pipe 14 between upper bearing 92 and lower bearing 94. The sleeve has anchoring bow springs 96 which are designed to slide up and down the borehole easily but prevent sleeve 90 from rotating with pipe 14. The sleeve 90 is rotatably mounted about the drill string 14. The sleeve is provided with a plurality of circumferential aperture rows 98A to 98n. Each row 98A is provided with a plurality of vertical slots 100. The slots in each row as shown are staggered from the slots in the other rows. Any desired arrangement of slots to obtain the desired signal can be made. The drill string 14 has slot 102. Preferably, there is one magnet 84 on the rotary table for each slot in sleeve 90. Thus, the recorder from switch 88 will have an output signal for each time the slot in sleeve 90 is opened and closed. It is to be recognized that this signal actually imparted to the earth may be slightly later in time than the signal detected at the rotary table, largely because of pipe twist. It is to be understood that we can put any number of slots in sleeve 90, as desired and practical. Then, for any given rotation or rpm of the drill string we know the signal which is being imparted into the earth.

Figures 7, 8:
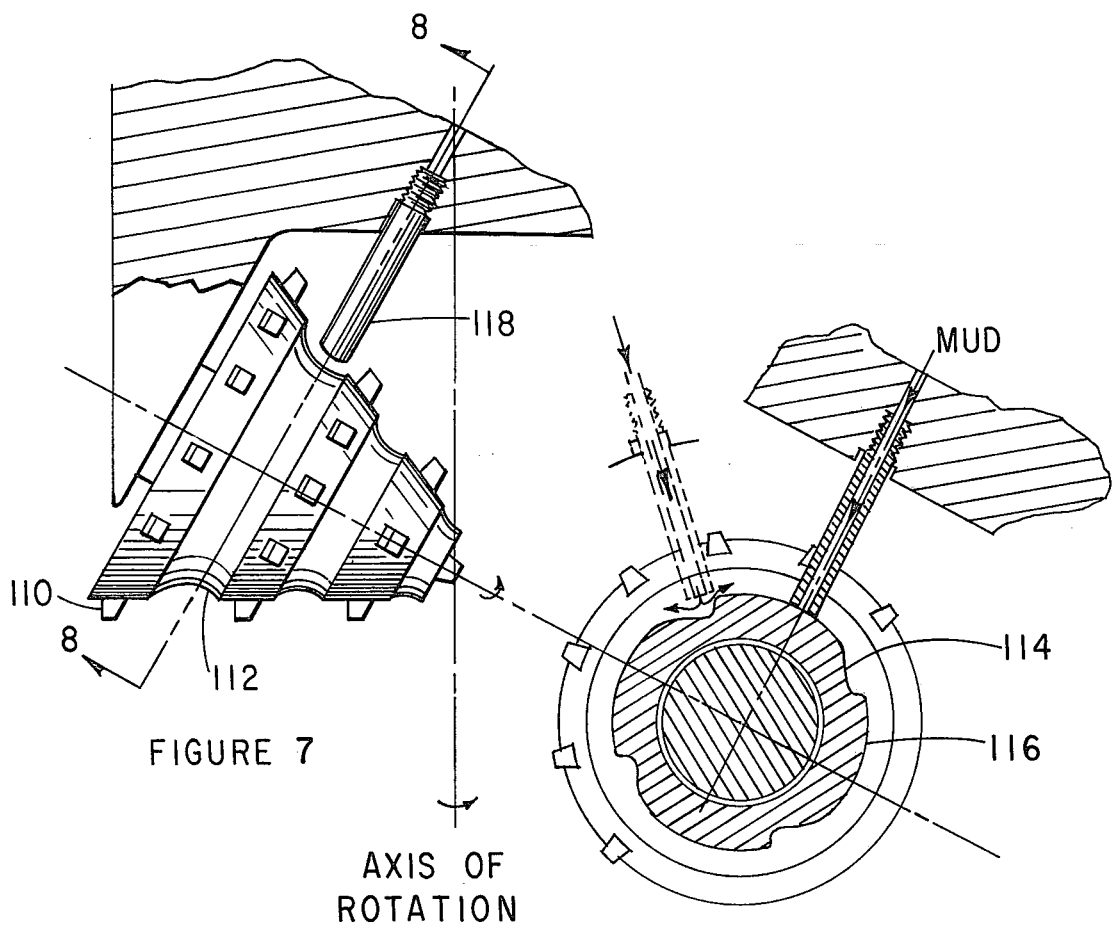
FIG. 7 is a bit modified to function as a mud siren.
FIG. 8 is a view taken along the line 8—8 of FIG. 8.

Attention is next directed to FIGS. 7 and 8, which show a means for activating the siren mechanism using the bit cones themselves as the value. On a conventional rock bit cone, there are several rows 110 of teeth separated by blank zones 112 where no teeth are present. These blank zones are required for clearance so tht teeth of the other two zones can intermesh. These blank zones are modified and are used to provide the siren valving action. By cutting a series of cups 114 or adding cam lobes 116 into the blank zones and directing a portion of the mud stream through nozzle 118 toward zone 112, an effective mud siren is created. The stream of fluid through nozzle 118 is interrupted by cam 116 as the bit is rotated and is permitted to flow by cup 114 as illustrated in FIG. 8. A very suitable valve design here is the poppet type because the flow aids closing it and the opening rate of the aperture is high. A common drill pipe rotation speed is 200 rpm. The cones of the typical rotary drilling bit rotate at from 1.2 to 1.8 times the speed of the drill pipe, depending on the particular cone shape, type of teeth, etc. Taken at an average of 1.5, the cones rotate at 300 rpm or 5 revolutions per second, which will remain constant as long as the cones engage the rock formation on the bottom of the hole and the rotary table speed is kept at 200 rpm. By increasing or decreasing the rotary table speed, the cone rotation speed can be raised or lowered at will. In the embodiment shown in FIGS. 7 and 8, and by using ten slots or can faces, a frequency of 50 Hz is generated by the mud siren when the rotary table speed is maintained at 200 rpm.

Figure 9:
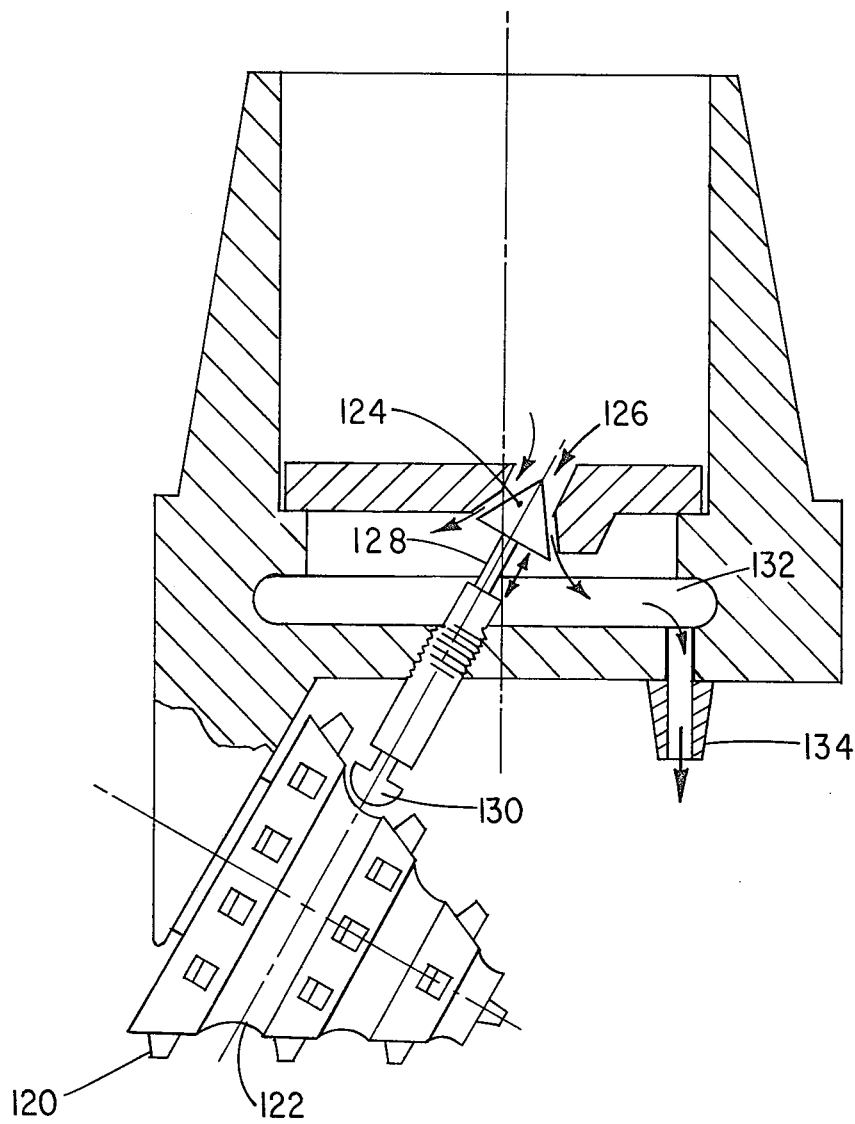
FIG. 9 is another valve modification to function as a downhole mud siren.

In FIG. 9, there are shown several rows of teeth 120 and several blank zones 122. In this embodiment, there are also cams about the blank zone 122. These cam zones are used to activate a valve. The valving mechanism is spring-loaded and includes valve 124 and valve seat 126. The valve has a valve stem 128, which is spring-loaded to an open position. The lower end of valve stem 128 has a head 130 which rides in blank zone 122. As it rides up and down over the cams, the valving action of opening and closing the valve occurs. Again the number of cams and their position, together with the rotation of the drill pipe, determines the frequency of interruption of the fluid. The circulating fluid, when the valve 124 is opened, passes downwardly into chamber 132 and out jet nozzle 134 to provide its normal functions. Means of interrupting the drilling fluid by drill bit to improve drilling results is shown in U.S. Pat. No. 3,216,514, issued Nov. 9, 1965, to F. B. Nelson.

While the above description has been given in detail, it is possible to use other modifications thereof without departing from the spirit or scope of the invention.

What we claim is:

1. A downhole seismic source for use when drilling a borehole in the earth using a rotating drill string through which a drilling fluid is circulated, which comprises:
   a section of drill string having at least one slot in the wall thereof;
   a sleeve rotatably surrounding said section, said sleeve having a plurality of spaced-apart slots arranged to align with said slot of said section during rotation of said sleeve with respect to said section;
   means to prevent rotation of said sleeve during the rotation of said section of drill string.

2. A source as defined in claim 1 in which said sleeve has a plurality of slots arranged in circumferential rows, the slots in any one such row being staggered with respect to the slots in the other rows.

3. A source as defined in claim 1 in which said means to prevent rotation includes rib bow spring attached to the outer wall of said sleeve and the longitudinal direction of each rib of said bow springs is parallel to the axis of said sleeve.

4. A downhole seismic source for use when drilling a borehole in the earth using a rotating drill string through which a drilling fluid is circulated which comprises:

a drilling bit body having a plurality of cones and attachable to the lower end of said drill string, at least one cone of said body having alternate rows of teeth and blank zones, said blank zone having cups and lobes spaced about said zone;

a fluid nozzle carried by said body to receive drilling fluid from said drill string, the lower end of said nozzle being flush with said lobe so that said lobe is ajdacent said nozzle the flow of fluid through said nozzle is interrupted and when said cup is adjacent the lower end of said nozzle fluid flow is permitted.

5. A downhole seismic source for use when drilling a borehole in the earth using a rotating drilling string through which a drilling fluid is circulated which comprises:

a drilling bit body having a plurality of cones and attachable to the lower end of said drill string, at least one cone of said body having alternate rows of teeth and blank zones, said blank zones having cups and lobes.

said bit body having a fluid passage therethrough;

a valve seat in said fluid passage;

a valve means having a stem with valve for sitting in said valve seat, the opposite end of said stem opposite said valve arranged to ride up said blank zone of said cone, said valve alternating opening and closing said fluid passage when the opposite end of said stem is adjacent said cups and said lobes of said blank zone;

means biasing said valve means toward said blank zone.

* * * * *